Dec. 16, 1952    C. KATZEN ET AL    2,621,571
TEMPERATURE-CONTROLLED FILM PROCESSING APPARATUS
Filed Oct. 1, 1948    9 Sheets-Sheet 1

Inventors:
Cyrus Katzen,
& Thomas R. Games

By Homer R. Montague
ATTORNEY

Dec. 16, 1952    C. KATZEN ET AL    2,621,571
TEMPERATURE-CONTROLLED FILM PROCESSING APPARATUS
Filed Oct. 1, 1948    9 Sheets-Sheet 6

Inventors
Cyrus Katzen,
& Thomas R. Games

By Homer R. Montague
ATTORNEY

Patented Dec. 16, 1952

2,621,571

UNITED STATES PATENT OFFICE 2,621,571

TEMPERATURE-CONTROLLED FILM PROCESSING APPARATUS

Cyrus Katzen and Thomas R. Games,
Washington, D. C.

Application October 1, 1948, Serial No. 52,184

7 Claims. (Cl. 95—89)

This invention relates to film developing apparatus, and has for its principal object the provision of an improved automatic film treatment apparatus of the general type disclosed and claimed in our copending application, Serial No. 746,176, filed May 6, 1947, entitled "Automatic X-Ray Film Processing Apparatus," now Patent No. 2,534,603, issued Dec. 19, 1950, of which application the present case is in part a continuation.

A more particular object of the present invention is to provide, in a machine of the general type referred to above, means and mechanism which will permit the use of a very rapid developing stage in the process, so that development may be carried out, for example, at much higher temperatures and hence at a greater speed than has heretofore been employed with machines of this kind.

A further object of the invention is to provide a processing machine in which, while the general principle is adhered to of transmitting the treating fluids toward and away from the exposed film (rather than physically moving the films themselves into and out of the treating baths), the time of the process which is represented by the developing stage only may be shortened, but without subjecting the films or plates to unequal treatment, by a physical movement of the film or plate holder into and out of a treating bath whose presence in the treatment tank is under the control of cycle control mechanism of the same type as was utilized in the invention of our prior application referred to above. To this extent, the present invention makes use of the well-known technique of moving the film rather than moving the fluid, but this use is combined with the same basic and novel principle of movement of the treating fluid to provide a system having substantial advantages over the prior known systems, and for some purposes over the system or our earlier application noted above.

A further object of the invention is to provide a film treating mechanism which is particularly adapted to the control of temperature in the treating baths, either upwardly or downwardly from the prevailing ambient temperature, so that proper treating conditions may be maintained even under adverse climatic conditions.

Still another object of the invention is to provide a machine of the same general type in which the parts are disposed and arranged in such a manner that much larger negatives or films may satisfactorily be handled, but in which the arrangement never the less places the loading and unloading point or level at a convenient height for these operations.

Another object is to provide means for the injection of a suitable "short-stop" fluid, such as acetic acid, into the rinse water which immediately follows the developer solution in the treating tank, whereby to terminate the development uniformly and rapidly over the entire area of the film or plate being treated, and thus to avoid localized overdeveloped areas in such films or plates, as well as to prevent premature exhaustion of the fixing bath due to carry-over of un-neutralized alkali from the developer bath.

A further object is to provide in a mechanism of this class, means for the automatic injection of a chemical wetting agent into the wash water (or even into the other processing solutions) at a predetermined time or times in the machine cycle, to increase the efficacy of the water or solutions.

An important feature of the machine is the provision therein for the carrying out of manually controlled developing, fixing and/or washing operations, with the advantages of fully automatic control of the solution temperatures, but without interfering with an automatic cycle of processing which may be going on at the same time within the machine. Thus, the machine provides for fully automatic or fully manual operation, or for a simultaneous combination of these methods.

The above and other objects and advantages of the invention will best be understood from the following detailed specification of preferred embodiments thereof, taken in connection with the appended drawings, in which:

Fig. 13 is an enlarged view of a portion of Fig. 7, Figs. 14 to 16 are schematic views of alternative physical arrangements of the treating tanks, storage tanks and fluid pumps.

The machine described and claimed in our earlier application referred to above provides a fully automatic film or plate developing, fixing and washing process well adapted to its intended purpose. For certain purposes, however, such as for very high speed developing processes utilizing highly active developers, the principle of moving the solutions to and from the film, rather than moving the film into and out of a series of baths, requires modification.

For example, when using a well-known and standard developing process in which the films are in the developer solution for a time of the order of 10 minutes, the time required to fill and empty the treatment tank is so short compared to the total treating time that no noticeable differential in development is noticed between upper and lower portions of the film, even though the lower portions obviously are subjected to a longer exposure to the developing fluid. When, however, the chosen process requires only a fraction of the assumed 10-minute "standard" development, then a 30 or 60 second fill or empty time becomes intolerable, since the difference in treating time as between upper and lower film portions may produce a wide difference in character or poor uniformity of treatment of such portions.

Again, where the principles of our prior application are applied to apparatus for the treatment of relatively large films or plates, such as the standard 14 by 17 inch medical X-ray film, the size of the treatment tank would require a large volume of treating fluid to be pumped into and drained out of the tank. Unless inconveniently large, powerful and expensive pumps are coupled to the tank by very capacious conduits, the filling and emptying times may again become large compared to the total treating (developing) time.

Another factor in which the utility of our prior machine is limited, though not fatally so, is in the lack of an integrated temperature control system adapted to permit close regulation of the treating bath temperatures, and thereby to render the apparatus independent of adverse ambient temperature conditions. Our present machine herein described provides a novel arrangement for achieving such control in a compact and efficient configuration of parts, to minimize the machine-space required and to keep the operating cost for heating and/or cooling power at a desirably low figure.

In addition, we have provided in our present machine an integrated control for the outlet conduits of the treating and the solution-storage tanks, to facilitate the ready and simultaneous flushing out of all such tanks for cleaning purposes, for example when it is desired to replace old or exhausted treating fluids.

Figures 1, 19:
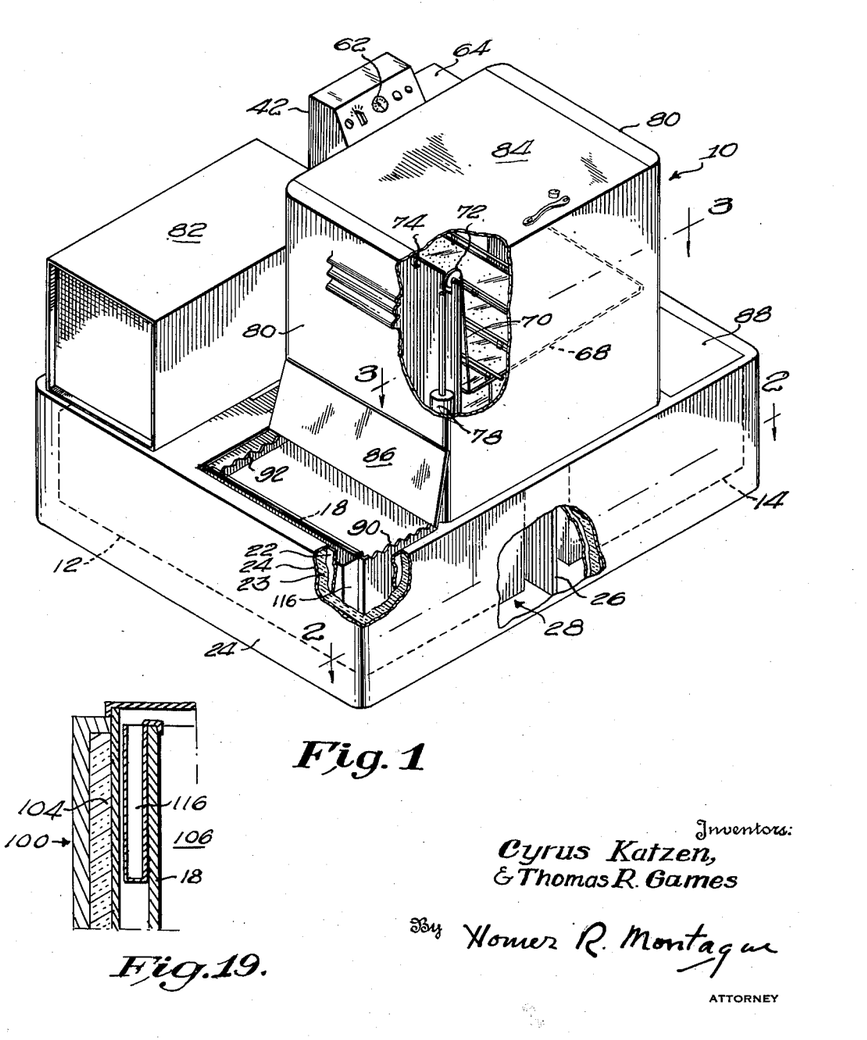
Fig. 1 is an isometric view, partly broken away, of an apparatus adapted for treating large size films or plates, such as medical roentgenograms.
Fig. 19 is an enlarged fragmentary sectional view of the installation of an auxiliary tank in one of the water jacket spaces of Fig. 1.
Figure 2:
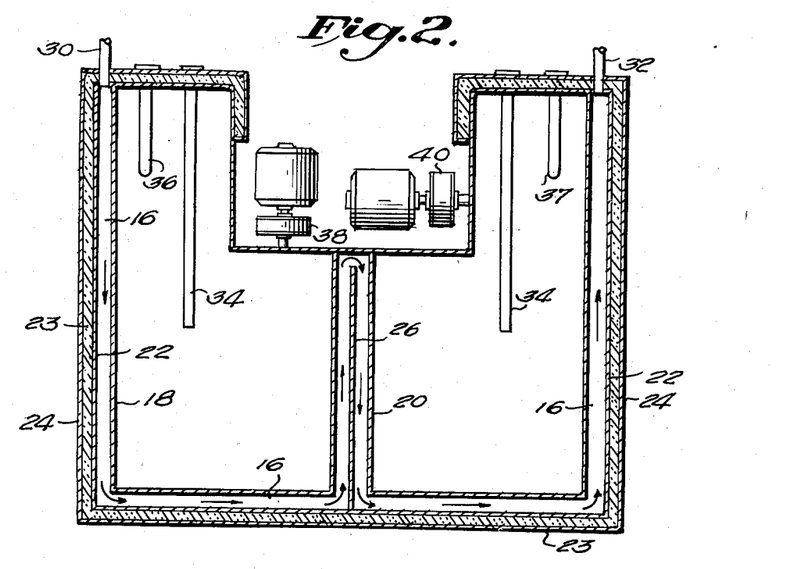
Fig. 2 is a horizontal section taken through line 2—2 of Fig. 1.
Figure 3:
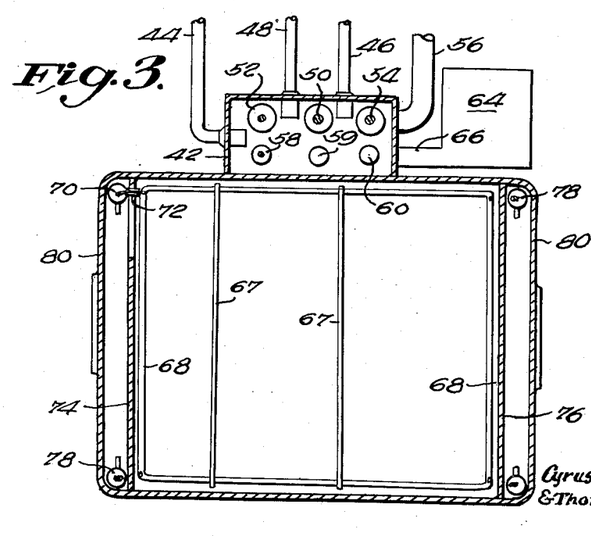
Fig. 3 is a similar section taken through line 3—3 of Fig. 1.

Figs. 1 to 3 of the drawings illustrate our presently preferred form of developing and treating apparatus as adapted for handling of medical roentgenogram films or plates of large size. Since the operative mechanisms, controls et cetera of such machine may be simply larger models of those employed for a machine expressly designed for the smaller dental films, we do not herein describe in detail such features, as the technical aspects thereof will be obvious from a study of our earlier disclosure referred to above, and repeated with modifications in connection with the apparatus shown in Figs. 4 to 13 of the present application. The description of the Fig. 1 machine will therefore be limited, for brevity, to the essential features of arrangement of the parts to provide a compact and efficient equipment, and to those operative features which necessarily differ more or less from corresponding aspects of the "dental" apparatus to be described later herein.

The treating tank portion shown in Fig. 1 is generally designated by numeral 10, and is arranged above and resting upon a pair of storage tanks 12, 14 adapted to contain a photographic developer and fixer solution, respectively. The arrangement of these tanks generally follows that disclosed in the prior application referred to above, in that the two storage tanks 12 and 14 are utilized as a support for the upper or treating tank 10, so that solutions pumped or otherwise forced from the storage tanks into the treating tank may be returned directly to the storage tanks by suitable dump valves, this dumping action resulting from the force of gravity so that no power is required in the operation of returning the solutions. The tanks 12 and 14 of Fig. 1 are shown as double walled along their front, side and bottom areas, so that a temperature controlling bath may be circulated about each tank, provision being made for heating or cooling this circulating bath to maintain the desired temperature of the developer and fixer. As best shown in Fig. 2, the channel for this circulating bath is indicated by numeral 16 and lies between the walls 18 and 20 defining the respective storage tanks, and an outer metal shell 22. A layer of insulating material, such as fiber glass or the like, numbered 23, surrounds the water bath, and may in turn be surrounded by an outer wooden or metallic cabinet outer wall 24. A vertical baffle plate 26 (Fig. 2) ensures a flow of the circulating bath water between the inner walls of the storage tanks, and as indicated in Fig. 1, the bottom wall of each tank is spaced upwardly (as upon supporting legs) from the bottom of the tank assembly, to provide for circulation of the temperature controlling bath beneath each tank, in the space as indicated by numeral 28. Inlet 30 and outlet 32 for the circulating bath are arranged in communication with the channel 16, as shown in Fig. 2.

In order to provide for accurate control of the temperatures of the developer and fixer solutions themselves, to a degree independent of the temperature of the circulating water in the channel or jacket 16, each of the storage tanks is provided with an electric immersion heater designated by numeral 34, and a thermally responsive control element 36 in one tank which controls the application of heat to said heaters in a manner which will be clarified below. A second thermally responsive control element 37, which may be in the same tank or, as shown, in the other, controls the admission of cooling water to jacket 16. The temperatures of the solutions in the two tanks are necessarily approximately equal since each is in heat exchange relation to the water jacket, and if such temperature deviates in either direction from the desired or normal value, one or the other of the thermo-switches 36 or 37 will operate to correct for such deviation. A pair of pumps 38 and 40, each driven by a suitable electric or pneumatic motor, are arranged within a space between the rear extensions of the storage tanks, and are operated during the controlled cycle to pump one or the other of the two stored fluids from its storage tank into the treating tank. Alternatively, the solutions may be forced from the storage tanks up to the treatment tank by applying gas pressure to the storage tanks, in which case these tanks will need to be provided with hermetically tight lids.

The connections by which the solutions travel to and from the storage vessels 12 and 14 are best shown in Fig. 3, in which numeral 42 indicates a manifold or shroud located at the rear of the treatment tank 10 and into which empty pipes or conduits 44 and 46 leading from the respective pumps 38 and 40, so that the desired solution can be discharged into the shroud 42 and thence through an aperture in the lower end of its forward wall into the treating tank proper. An inlet conduit for rinse water is indicated by numeral 48. In order to return the solution from the treatment tank either to the drain (in the case of rinse water) or to the appropriate storage tank (in the case of developer and fixer), there are provided a series of three dump valves, the center valve 50 opening downward to the drain pipe of the machine, and the valves 52 and 54 opening respectively into the appropriate storage tanks 12 and 14. A large conduit 56 is also provided for the transfer of heated air into the manifold 42, from which it is passed in the treating tank after completion of the developing, fixing and washing, to dry the films or plates therein at a relatively high speed.

As disclosed in our prior application, the cyclical control of pumps 38 and 40, and synchronized control of the dump valves and the wash or rinse water inlet valve, will enable the films or plates being treated to be subjected to the required solutions in the proper order. However, if the time required for filling and emptying the treating tank 10 is large as compared with the desired development time, uneven development of the plates from top to bottom would result; and the same objection would apply if the size of treating tank 10 were very large as compared with the diameters of convenient supply and drain lines. In order to ensure that development of the plates commences at the same time over their entire areas, we provide herein mechanism for mechanically lifting and dropping such plates, the latter being raised to the upper portion of the treating tank while the latter is being filled to a height which would normally cover the entire film or plate, at which time the mechanism is operated to lower the entire rack of films or plates into the solution. Upon completion of the development, the films are first raised out of the treating bath in a rapid motion, and the solution is allowed to drain out via the dump valve back to storage tank 106. Rinse water is now admitted to the treatment tank, together with a quantity of short stop fluid injected by a mechanism described below, and a quantity of a chemical wetting agent injected by a duplicate of that device. The films are lowered into this bath for a time and again raised, the bath replaced with fixing solution from tank 14, and the cycle repeated. As in the prior application, a float control 58 ensures that the solutions are in each step of the cycle brought to the proper level in the treating tank, and an overflow line 59 is also provided whose opening is at a somewhat higher level than that defined by the operating level of the float control, so that during the rinsing phases of the cycle the rinse water may continuously be replaced in the treating tank, passing through the overflow line to the drainpipe. A well 60 to receive a thermometer is provided in manifold 42 to enable the operator to check the solution temperatures, this thermometer being connected for indication at the control panel of the machine as upon a dial 62.

A quantity of a suitable "short-stop" liquid, such as acetic acid with or without an added film hardening solution, is contained within a supply tank 64 connected by a conduit 66 to the manifold 42, and a solenoid valve is provided to enable a portion of such liquid to be injected into the treating tank 10 along with the first rinse water. The mechanism by which this may be accomplished is described more in detail below, in connection with the second form of the invention to be described.

The rack upon which the usual film hangers or carriers 67 are supported is indicated in Figs. 1 and 3 by numeral 68, and is supported for vertical movement upon four flexible cords 70, each of which passes upwardly over a pulley 72 mounted for rotation upon the upper edge of one of the two septum plates 74, 76 which define the interior of the treating tank 10. The respective cords are secured to the operating members of four pneumatic cylinder and piston assemblies (or equivalent means described below) designated by number 78, which lie between the septum plates and the outer tank walls 80. It is clear from the above that the energization of the pneumatic cylinders will cause their respective pistons and piston rods to raise and lower, thus enabling the film rack and films carried thereby to be raised and lowered in the manner described above. Automatic timing control of the pneumatic cylinders may be achieved by usual and well-known forms of timers, such for example as the timer arrangement of our prior application.

Means for controlling the temperature of the water which forms the water jacket for the storage tanks 12 and 14 may be provided, and include a known form of refrigerating compressor 82 which may conveniently be mounted upon the rearward extension of tank 12, for example. The manner in which the compressor 82 and a cooperating heating element may be controlled will be fully described below in connection with a second form of the invention, to which reference may be made for such details of arrangement.

For the treating of standard full-sized X-ray films or plates, such as those having a size of 14 by 17 inches, it is desirable to provide a large storage capacity for the developer and fixer solutions, and the above arrangement enables 60 or 75 gallons of each to be stored in the tanks and maintained at the proper temperature for the particular process being used. When plates of this size are to be handled, it is convenient to arrange them upon the rack 68 with their 14 inch dimension vertical, which reduces the required height for treating tank 10 to something over 28 inches. By using relatively wide, flat storage tanks, the overall height of the machine can be kept in the neighborhood of fifty inches, which is a convenient value to enable the loading and unloading of the films into tank 10 through hinged door 84, this door being interlocked in the manner described in our prior application to prevent it from being opened inadvertently during the treating cycle. The rearward extensions of the storage tanks, best seen in Fig. 2, also increases their capacity for a given height, and provides between them the necessary space for the motor driven pumps 38 and 40. Also, as seen in Fig. 1, the doors 86 and 88 provide access to the liquids in the storage tanks (and also to the water in the water jacket), to enable films to be treated manually when desired. The front edge of each storage tank inner wall may be provided with serrations as at 90, and similar serrations may be provided on a rearward bracket 92 of each tank, so that one or more plate holders may be hung thereon for such treatment.

In order to permit the use of the temperature control advantages of the machine in connection with an occasional development or fixing operation to be carried out by hand, auxiliary solution tanks may be placed down into the water jacket as shown and described in detail in connection with the second form of the invention to be described below.

Referring now to the form of the invention illustrated in Figs. 4 to 13 of the drawings, there is illustrated a machine of the general type covered in our copending prior application referred to above; that is, one whose major components are arranged for the efficient treatment of films or plates of a smaller size than those handled by the first form of the invention of Figs. 1 to 3 hereof. In particular, this form of the invention is intended for the developing, fixing, washing and drying of X-ray films of a size used for dental X-rays, although the principles, and indeed the identical machine, may equally well be used for the treating of ordinary photographic films or plates under carefully controlled conditions.

Figure 4:
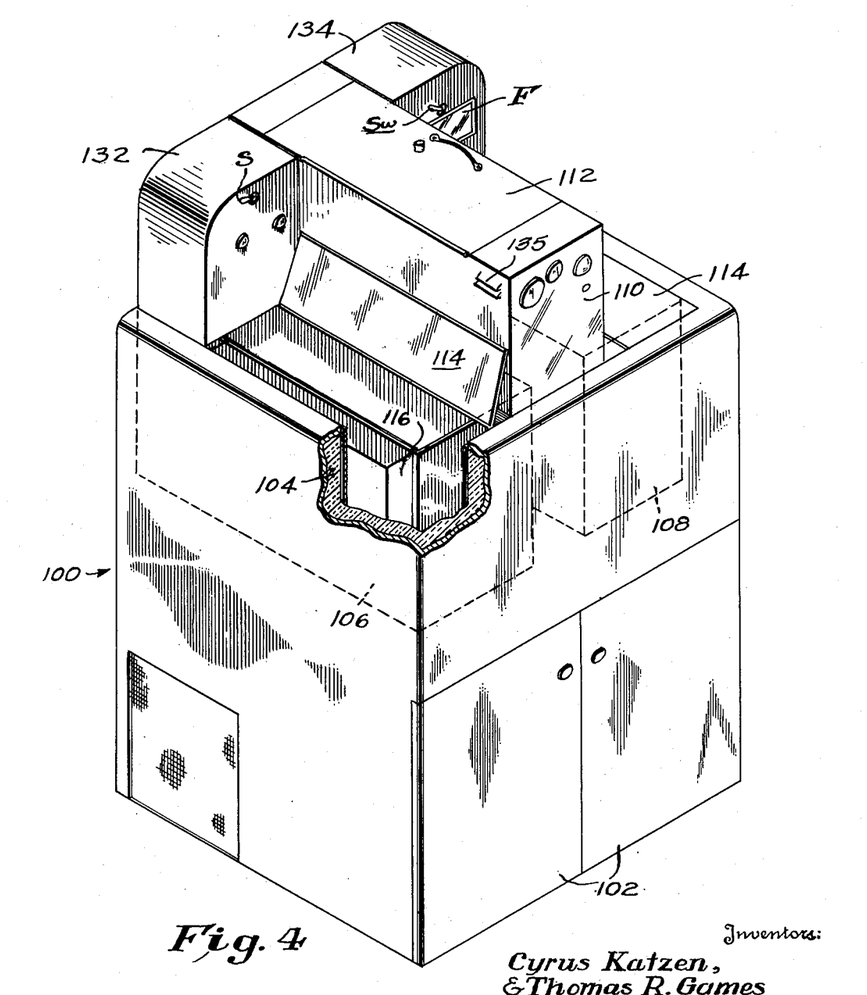
Fig. 4 is an isometric view, partly broken away, of a modified apparatus particularly for smaller films such as dental roentgenograms.

As shown in the isometric view of Fig. 4, this form of the invention is embodied in a cabinet arrangement closely paralleling the machine of our prior application, numeral 100 designating the cabinet generally, provided with doors 102 providing access to a storage compartment for supplies and having a well or upwardly opening compartment lined with thermal insulating material 104 along its front, side and bottom walls. Seated within this well is an array of tanks comprising water-jacketed storage tanks 106 and 108 for the developer and fixer solutions, partially surmounted by a treatment tank 110 having a hinged lid 112 through which the films or plates are inserted and removed. Each of the storage tanks 106 and 108 is also provided with a hinged lid 114 which, when opened, not only enables access to be had to the fluids in those tanks, but also to a portion of the water jacket itself. Auxiliary film treating tanks designated 116 are provided for selective placement within the exposed portions of the water jacket, for a purpose to be described.

It will be observed that the general relationship of the storage tanks and the treatment tank follows that disclosed in our prior application, in which the arrangement of the treatment tank in overlapping relation to both of the storage tanks facilitates the return of treating fluids from the treatment tank to the respective storage tanks by gravity flow, under the control of valves, so that the use of power pumps or air pressure for fluid movement is required only for reverse flow of such fluids when the treatment tank is being filled with one or the other. (This same arrangement, of course, is also characteristic of the form of the invention described in connection with Figs. 1 to 3 hereof.) Unlike the prior application, however, the present machine is designed so that the level of fluid in the treatment tank 110 never rises above a point approximately half-way up the tank, the space thereabove being utilized to receive the films (or racks of films) which are raised rapidly out of the fluid in the treating tank at the end of each treatment period, being held in their raised position during the operation of emptying the treatment tank and the subsequent filling of the tank with the next solution.

Figure 5:
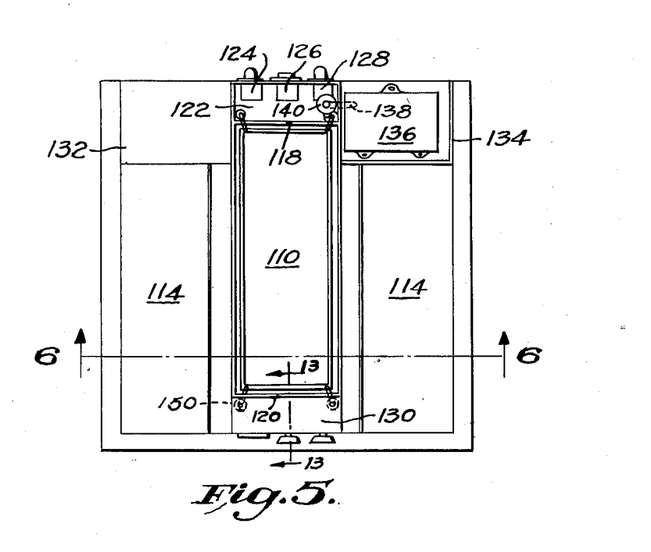
Fig. 5 is a plan view of the machine of Fig. 4, the cover of the treating tank being removed.

As shown in Fig. 5 of the drawings, which is a plan view with door or lid 112 removed for clarity, the treatment tank 110 is divided by internal partitions 118 and 120 which define a filling manifold 122 at the rear of the machine, into which the solutions or rinse water are admitted via ducts 124, 126 and 128 and pipes leading thereto from the pumps or from the fresh water supply, and an emptying manifold 130 at the front of the machine, containing an arrangement of dump valves in accordance with our prior application. A pair of lateral casings 132 and 134 lie to either side of the rear portion of tank 110. Casing 132 contains a drying blower for passing heated air into manifold 122 and thence into and through the heating tank and out via louvers (135 of Fig. 4) on the sides of the emptying manifold 130. This casing 132 also has on its forward facing surface a pair of indicator lights controlled by liquid level switches in each of the storage tanks 106 and 108 so as to signal whenever the corresponding solution is depleted to an extent to hamper operation of the machine. As will be described below, these switches may also be connected to prevent operation of the machine whenever such a condition exists. A master switch S may also be located on the front of casing 132, which will start the operation of the temperature controlling elements of the apparatus only, in order to bring the water jacket and solutions to the proper temperature prior to the initiation of the first machine cycle. Casing 134 contains in its lower portion a lamp bulb (not shown) which directs illumination through a ruby colored filter F upon operation of a control switch Sw (see Fig. 4) to facilitate safe inspection of films or the like in the usual manner employed in darkrooms. The upper portion of casing 134 contains an acetic acid short-stop injector mechanism comprising a supply tank 136 having a valved outlet 138 entering manifold 122 and controlled by a solenoid valve 140 which is secured to the inner wall of the manifold. Preferably, the valve in outlet 138 is integral therewith and is provided with an operating stem arranged to be contacted by a plunger of the solenoid, so that tank 136 may be removed for refilling without the necessity for unscrewing fittings or the like, casing 136 having a removable lid, shown off in Fig. 5, for this purpose.

Figure 6:
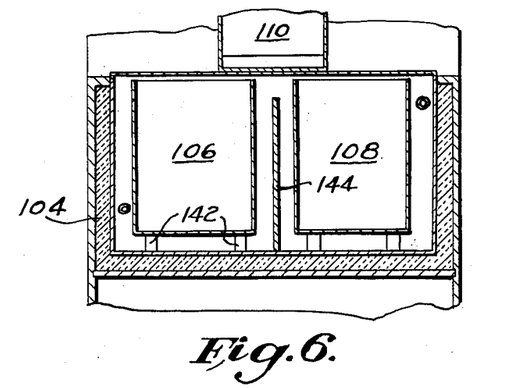
Fig. 6 is a fragmentary vertical section taken on line 6—6 of Fig. 5.

Fig. 6 of the drawings is a sectional view illustrating the manner in which the storage tanks 106 and 108 are supported as upon legs 142 in spaced relation to the outer wall of the water jacket, and also showing the location of a baffle 144 arranged to direct water about the inner or facing walls of these storage tanks, in a manner similar to baffle 26 of Fig. 1.

Figure 7:
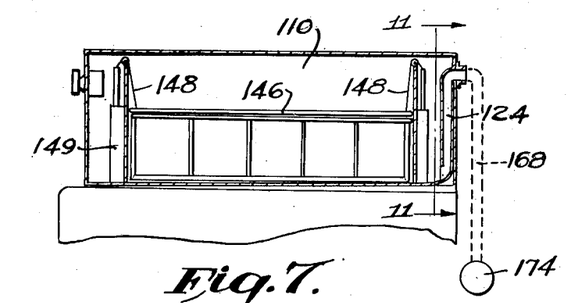
Fig. 7 is a fragmentary vertical section taken through the treating tank.
Figure 8:
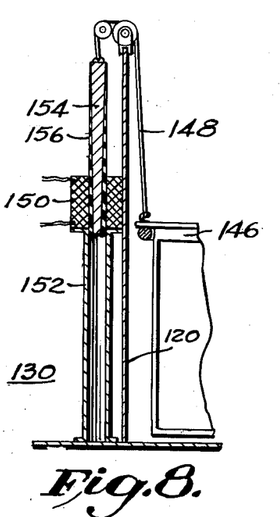
Fig. 8 is an enlarged detail section through one form of film elevating mechanism.
Figure 9:
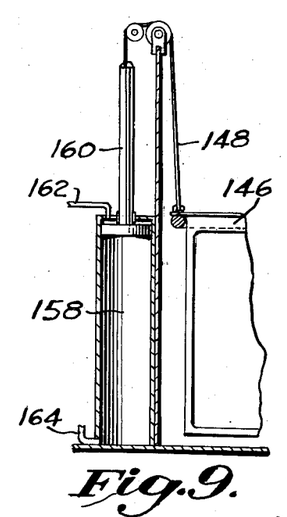
Fig. 9 is a similar view of a modified elevator.

As shown in the schematic side view of Fig. 7, the film supporting rack or racks 146 are arranged lengthwise in the treatment tank and supported by cords 148 passing around pulleys located atop the plates which separate the treating space from the end compartments. In a machine of this size, in which the height of the film racks 146 may be of the order of four to six inches, it is feasible to raise and lower the racks by means of solenoids having plungers connected to these cords. In Fig. 7 these solenoids 149 are shown as of a length about equal to the required throw or travel of their plungers, while in the enlarged fragmentary view of Fig. 8 is shown a solenoid 150 of reduced length support upon a well tube 152 adapted to receive a plunger formed of a tapered inner core 154 of magnetic material such as iron, and surrounded by a sleeve of non-magnetic plastic or the like 156. Since the amount of magnetic material per unit of length of the plunger increases from its lower towards its upper end, and since the solenoid 150, when energized, tends to drive the plunger in the direction to put a maximum amount of magnetic material within the solenoid, the plunger will be given a travel greatly in excess of the length of the coil, whereby if desired the entire coil may be located above the level reached by fluid in the manifolds 122 or 130, instead of being submerged, which latter arrangement requires waterproofing of the coil, or a suitable fluid tight casing thereabout. Alternatively, the operation of the film racks to upper position may be under control of a pneumatic cylinder, as illustrated in Fig. 9 by numeral 158, within which travels a piston having a rod or plunger stem 160 and controlled by pneumatic lines as at 162, 164. Other mechanical arrangements for elevating and lowering the film racks at desired points in the operating cycle, such as motors or linkages, can be utilized.

Figure 11:
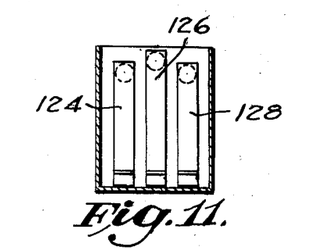
Fig. 11 is a vertical section on line 11—11 of Fig. 7.

We have found that it is very desirable to convey fluids entering the filling manifold 122 through ducts 124, 126 and 128 shaped in the manner illustrated in Figs. 7 and 11, to avoid splashing of the fluids against the walls of the manifold and possible reentry of one solution into the open end of a conduit leading from the pump which handles another solution and consequent contamination of solutions. At the same time, these ducts produce a swirling action of the entering solutions, which operating in connection with the agitation furnished by the passage of the solutions through the rotary pumps, keeps the solutions uniform in character and eliminates the settling of certain components in the storage vessels.

Figure 10:
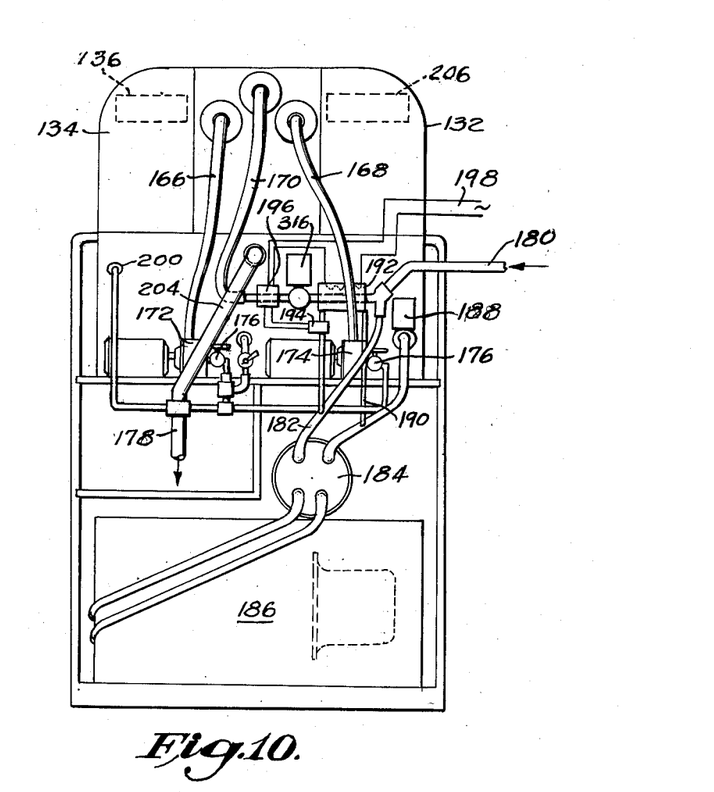
Fig. 10 is a rear elevation of the machine of Fig. 4, showing the controls and connections, in part schematically.

Fig. 10 of the drawings, which is a partly schematic rear view of the machine to illustrate the control and operating mechanism, shows the pipes or conduits 166, 168 and 170 leading to the rear wall of the treating tank 110. Pipes (conveniently flexible hose lines) 166 and 168 lead respectively to the motor driven pumps 172, 174 whose intake lines are in communication with the fluids stored in the storage tanks 108 and 106 respectively. Each of these intake lines is provided with a valve such as indicated at 176 adapted when opened to drain the contents of the corresponding storage tank into a drain manifold 178, for purposes of changing the treating solutions as they become exhausted. Also connected to the drain manifold is the outlet 200 for water in the cooling jacket, opened only for clean-out purposes. Numeral 180 designates the source of fresh water (obtained from the city water supply or the like), a portion of which water enters the water jacket about the storage tanks via a line 182 to the heat exchanger 184 which is automatically cooled by a usual form of refrigerating compressor 186, such cooled jacket water being controlled by a solenoid valve 188. A portion of the cooled water is tapped off by a pipe 190 and passed through a second smaller heat exchanger 192 surrounding the fresh water inlet to rinse line 170, so that when the city water supply is too warm the portion used for rinsing or washing the films in treatment tank 110 will be brought to a safe temperature. The extent to which this rinse water is cooled is controlled by a solenoid valve 194 in the cold water line returning from heat exchanger 192 to the line 182. Valve 194 is under the control of a thermal switch 196 in temperature-sensing relation to the pipe connecting the supply 180 with the rinse inlet hose 170, and this switch also controls the energization of an electric heating coil contained within heat exchanger 192, current for which is supplied over electric lines 198. Thus if the rinse water is too warm, switch 196 opens valve 194 to cool the same, while if the rinse water is too cold, the same switch energizes the heater shown in dash lines in exchanger 192. Jacket water after passing into the jacket via valve 188 returns to the drain manifold 178 through the outlet 200 from the upper level of the water jacket to the same drain manifold. When the rinse water in treatment tank 110 is to be drained, the rinse water dump valve in the front or emptying manifold 130 of tank 110 opens and allows the same to flow into the drain via the large conduit 204. The operation of the inlet and dump valve solenoid valves, and the energization of the pump motors, is controlled in accordance with a predetermined cycle by a timer of the kind specifically described in our prior application, or of an equivalent type as may be desired.

Referring now to Fig. 7, a special feature of the present arrangement is the inherent solution-mixing and agitating characteristic obtained by virtue of the relation of the developer and fixer inlet ducts 124 and 128. As there shown, it is clear that when tank 110 is filled to the desired level by pump 174 under the control of the float switch, the effective head of liquid in supply line 168 (for example) is greater than the head in duct 124, so that reverse flow through the pump (particularly if the latter is of the centrifugal type) occurs due to siphon action. When this reverse flow has depleted the level in tank 110 sufficiently to actuate the float switch, the pump 174 again runs to replace the liquid so lost, and this cycle repeats itself continuously until the developing (or fixing) phase has been completed under the control of the timer, and the solution in tank 110 returned to its appropriate storage tank. This agitating and circulating action is thus obtained without the use of any separate pumps, stirrers or the like.

Fig. 10 of the drawing also indicates schematically at numeral 206 an injector mechanism for a suitable wetting agent, such mechanism being operated by a solenoid valve just as described above in connection with the short stop injection mechanism 136 of Fig. 5, to inject a liquid wetting compound into any of the solutions being admitted to the treatment tank, under the control of auxiliary contacts on the timer of the apparatus. The use of wetting agents, particularly in the wash water, is well known in the photographic art to provide higher efficiency of washing.

Various changes in the particular arrangements of the components of the apparatus can be made without departing from our invention. For example, it is unnecessary that the storage tanks be physically connected with the treatment tank by a single housing, as either these storage tanks or the refrigerating compressor may be installed in different locations, or even in a separate room, without substantially altering the nature of the automatic processing. In such cases, a single set of storage tanks may serve several treatment tanks. Moreover, while ordinary city water supply mains will usually provide a sufficient flow of water for the rinsing or washing phases to enable a satisfactory speed of operation, an auxiliary storage tank for such rinse water may be necessary in some instances, particularly in the larger installations for handling large size medical roentgenograms. Also, it is not essential that the drying operation be carried out upon the films while they are in the treatment tank, since they may readily be removed to a separate drying chamber of any desired type, thus freeing the machine for the commencement of the processing of a second group of films or plates.

The provision of auxiliary developing and fixing tanks such as tank 116, of a size to be slipped into the water jacket or jackets about the storage tanks, enables hand processing to be carried out while the machine itself is in the midst of an automatic cycle, greatly increasing the flexibility of the apparatus, particularly where the doctor or dentist finds it necessary to furnish a quick reading of a roentgenogram, with all of the advantages of the temperature control features of the machine. Thus, the manual developing, fixing and washing operations may be carried out simultaneously with the operation of the machine in its automatic processing of other films or plates, and either manual or automatic processing may be carried on alone, as occasion demands. We consider this to be an important advantage which distinguishes our invention from all prior developments in this field.

Figure 14:
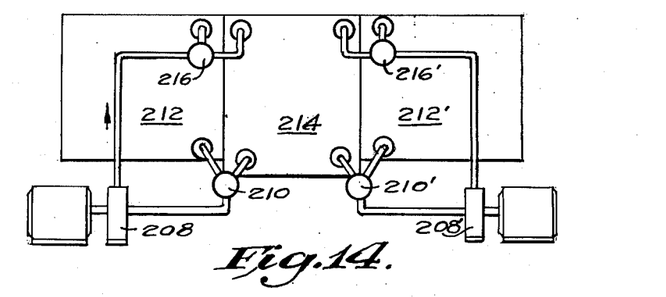
Figure 15:
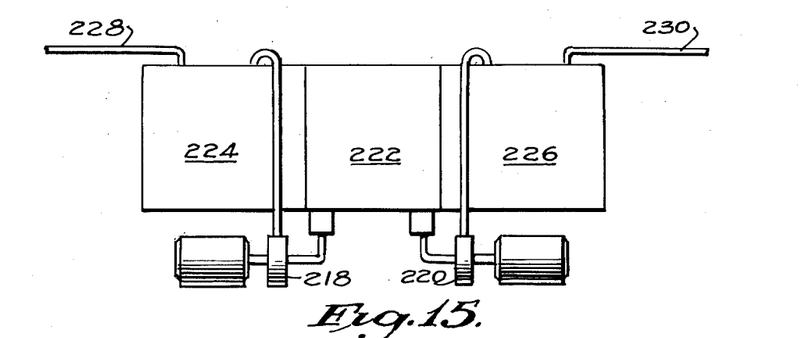
Figure 16:
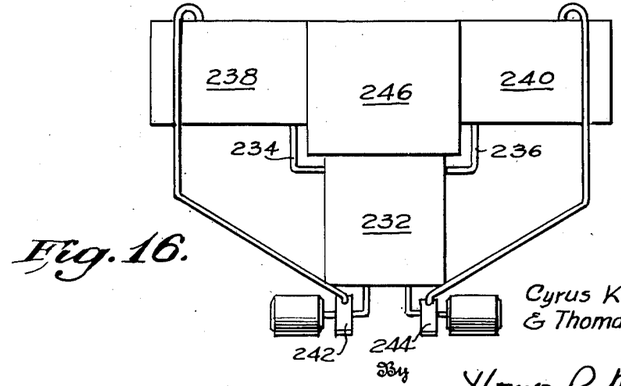

Figs. 14 to 16 of the drawings illustrate in schematic form three other possible arrangements of the treating and storage tanks. In Fig. 14, a motor driven pump is used for forced delivery of a solution from each storage tank into the treatment tank, and return, without dependence upon the force of gravity for emptying the treatment tank. Pump 208, for example, is connected by a two-way valve 210 with the bottom of the storage tank 212 and of the treatment tank 214, and by a second two-way valve 216 with the upper portion of these two tanks. It is clear that by a proper adjustment of these valves, fluid may be pumped out of the storage tank and into the treatment tank in the direction of the arrow, while if both valves are reversed, the same pump will operate to withdraw solution from the treatment tank and return it to the storage vessel. The same arrangement may be employed for the other solution, as by a pump and valves designated by the same numerals with the addition of a prime.

In all of the arrangements just described, it is desirable to provide dump valves opening from the bottom of the treatment tank into some sort of sump or manifold, individual to each solution outlet, to prevent contamination of solutions which would result from common piping.

In Fig. 15, pumps 218 and 220 are used to withdraw the respective solutions from the treatment tank 222 and return them to the storage vessels 224 and 226, while the reverse motion of either fluid is produced by a head of pressure directed into the hermetically sealed storage vessels by suitable gaseous pressure lines 228, 230. Obviously, the pumps could be completely dispensed with if the treatment tank 222 were hermetically closable, gas pressure being used also to force the solutions out of the treatment tank. Since the use of compressed air would accelerate oxidation of the developer, the use of an inert gas such as helium or nitrogen is preferred.

In Fig. 16, an arrangement is illustrated in which a treatment tank 232 is supplied with developer and fixer solutions, for instance by gravity flow through ducts 234, 236 from the respective storage tanks 238, 240, return of the solutions being accomplished by pumps 242 and 244. An auxiliary storage tank 246 for rinse water may be located above the treatment tank, and to the rear thereof, and permitted to fill the latter when required by suitable dump valve arrangements, thus ensuring an adequate and fast supply of wash water even where the water supply pipe is of inadequate size. The auxiliary water storage tank may be refilled from the city water supply during the entire time that developing and fixing is going on.

In all of the above modifications, the automatically controlled valves required for sequential operation have been omitted for clarity, the operation thereof being clear from the description of operation of the form of apparatus shown in Fig. 4, or in our prior application.

Figure 12:
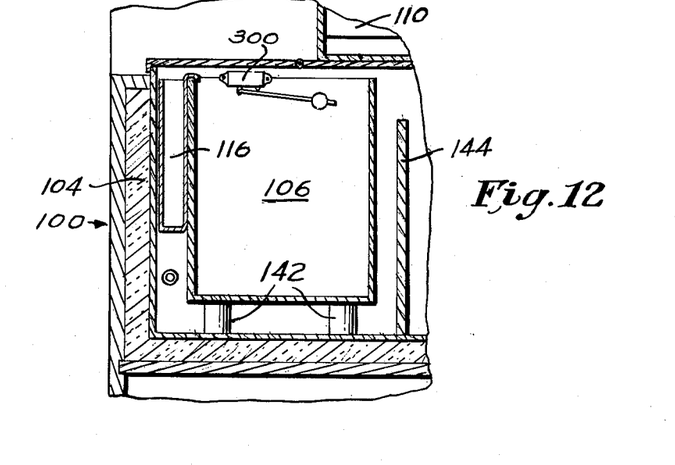
Fig. 12 is an enlarged view of a portion of Fig. 6.

As in our prior application, each of the machines of the present disclosure is preferably provided with a solenoid controlled latch for the treatment tank door, to prevent opening thereof during a cycle. Also, the same door is provided with an interlock switch which prevents the start of a cycle until the door has been latched. In the present refinement, a float switch such as is designated by numeral 300 in Fig. 12 is provided for each of the storage compartments, and is connected with the interlock switch in such a way as to prevent initiation of a machine cycle unless there is adequate solution in each of such tanks. A second set of contacts on each float switch is connected to a signal lamp mounted upon the front of casing 132, or in another convenient location, so as to indicate to the operator that the solution in either tank needs replenishment.

If desired, an automatic testing arrangement for determining the degree of exhaustion of the developer and fixing solutions may be incorporated, and this also may be arranged to prevent machine operation when either solution is in need of replacement, and to give an appropriate warning signal.

Figure 17:
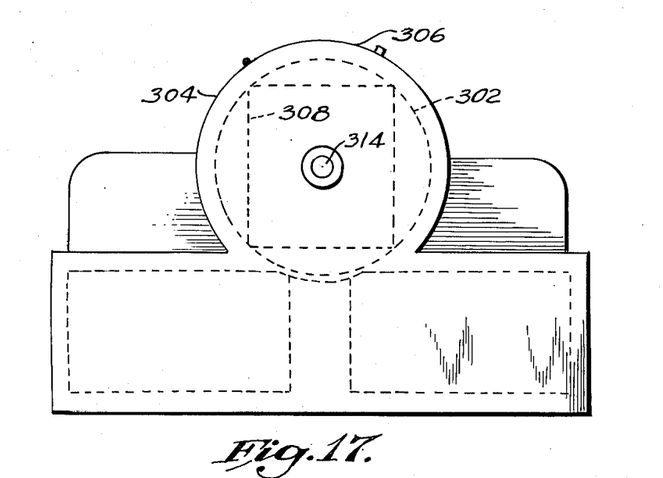
Fig. 17 is a front elevation of a modified form of apparatus, largely schematic.
Figure 18:
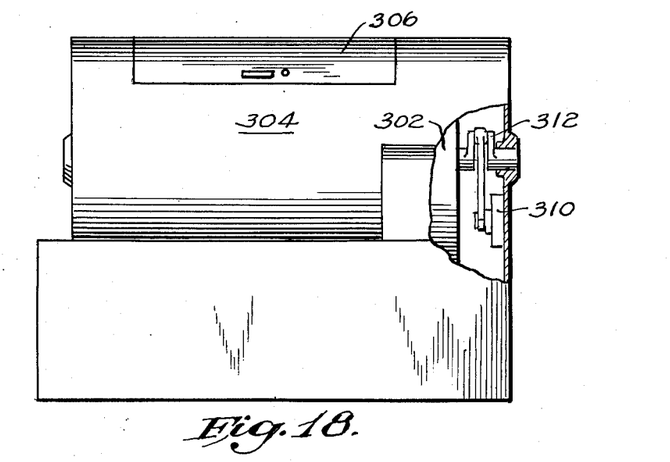
Fig. 18 is a side view of the machine of Fig. 17, parts being broken away.

As has been pointed out, the provision for mechanical lifting of the films or plates out of the treating solutions enables the use of very fast developing (and fixing) phases without subjecting one portion of the film to a relatively longer treatment than another. An alternative way of accomplishing the same result is illustrated in Figs. 17 and 18, in which the films or plates, in suitable racks, are loaded into a holder 302 mounted rotatably within a treating tank 304, the latter being provided with an access door 306. Holder 302 is arranged to retain the plate or film racks against sliding, as by frictional engagement of their edges with a series of tracks or guides 308 secured within the holder. The holder is arranged for rotation through 180° and return, or through successive 180° angles, by a motor 310 operating through a crank linkage 312 on the axle 314 of the holder. With this arrangement, each solution is allowed to enter the treating tank with the films in one orientation, so that the bottoms of the films start their treatment first, the developer (or fixer) gradually rising as the tank fills. At any time after the tank has become full, the holder 302 is given a 180° turn automatically under control of the cycle timer, so that when the treating solution drains out (or is pumped out), that end of each film which received the earliest contact with the treating solution is the first to be deprived thereof as the level in the tank is lowered. If the time required for draining is made approximately equal to the time required for filling, each portion of each film receives substantially the same treatment. This arrangement saves the need for solenoids, pistons or the like required for the elevation of the films or plates physically out of the treating solutions, and also appreciably reduces the height of the machine. In this method the chamber 304 could also run across the front of the machine as does the tank 10 in Fig. 1, for more convenient loading.

Figure 13:
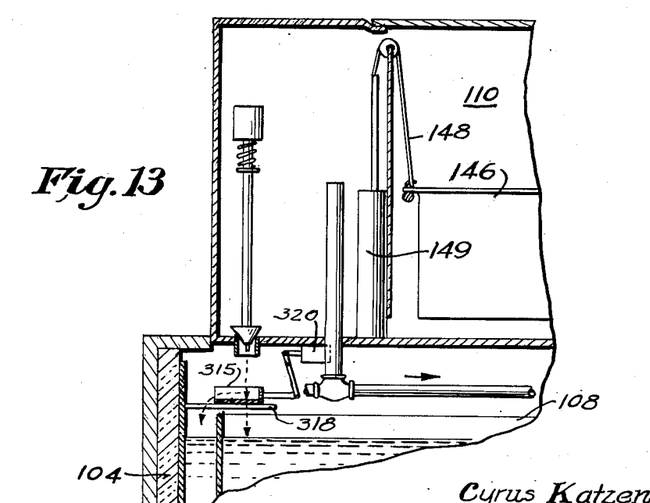

Since there is always a slight possibility of leakage of the solution in the treatment tank through an improperly seated dump valve and into the wrong storage tank, for example if a small piece of film or other matter is caught upon the valve or its seat, we provide means for diverting any leakage fluid away from the storage tanks. As shown in Fig. 13, this may take the form of a chute or equivalent diverting element 315, one being normally disposed beneath each of the developer and fixer dump valves, and slidable upon a guide 318. In the position shown in Fig. 13, any drippage from the dump valve will be diverted harmlessly into the water jacket surrounding tank 108, for example. At the end of the developer and fixer phases, however, when or just before the corresponding dump valve is opened, a solenoid such as 320 is automatically energized by auxiliary timer contacts to thrust the appropriate one of the diverting elements outward, so that the solution passes freely into its storage tank.

It is desirable to permit the user to give the treatment tank, storage tanks and water jacket spaces an occasional thorough cleaning out or flushing. To this end, we contemplate the provision of a separate control circuit which, when energized, will operate all of the outlet valves and dump valves to open positions, and will simultaneously open the main water supply line 180, jacket supply solenoid valve 188 and solenoid valve 316 in the rinse water inlet line to connection 170. This will permit the entry of water freely into the treatment tank and the water jacket, and into the storage tanks through their respective dump valves, the circulation being continued as long as desired.

It will be seen from the above description that we have devised a machine for accomplishing the stated objects of the invention, but many changes and modifications may be made therein without departing from the spirit of our invention as defined in the appended claims.

We claim:

1. In photographic processing apparatus of the class disclosed, a treatment tank, means for supporting films or plates therein, means for periodically conveying treating fluids into and out of said tank, and means for moving said supporting means into and out of said fluids in timed relation to the operation of said conveying means.

2. In photographic processing apparatus of the class described, a treatment tank, means for supporting films or plates therein, means for periodically conveying treating fluids into and out of said tank in a predetermined cycle, and means operable automatically during a part of said cycle for altering the position of said films or plates in said treating tank to ensure substantial equality of treatment of all parts of said films or plates.

3. In photographic processing apparatus of the class described, a treatment tank, means for supporting films or plates therein, means for periodically conveying treating fluids into and out of said tank in a predetermined cycle, and means operable automatically during a part of said cycle for inverting the position of said films or plates in said treating tank to ensure substantial equality of treatment of all parts of said films or plates.

4. In photographic processing apparatus of the class described, a treatment tank, a plurality of fluid storage tanks, fluid conduits between said treatment tank and each of said storage tanks, means for conveying treating fluids out of said storage tanks and into said treatment tank and return, means for conveying washing fluid into and out of said treatment tank, a cooler, conduits for circulating water through said cooler and about said storage tanks, and means for admixing a portion of the water in said conduits with washing fluid entering said treatment tank for controlling the temperature of said washing fluid.

5. In photographic processing apparatus of the class described, a treatment tank, a plurality of fluid storage tanks, means for conveying solutions from said storage tanks to said treatment tank and return in a predetermined cycle, means for initiating a cycle of operation, and means responsive to the depletion of fluid from said storage tanks for preventing operation of said cycle initiating means.

6. The invention in accordance with claim 5, in which said last-named means comprises a liquid-level switch located in each of said storage tanks.

7. The invention in accordance with claim 5, and signal means controlled in accordance with the fluid level in said storage tanks for indicating the lack of an adequate supply of fluid therein.

CYRUS KATZEN.
THOMAS R. GAMES.

REFERENCES CITED

The following references are of record in the file of this patent:

UNITED STATES PATENTS

| Number | Name | Date |
|---|---|---|
| 665,937 | Schneider | Jan. 15, 1901 |
| 1,254,300 | Baker | Jan. 22, 1918 |
| 1,772,834 | Hopkins | Aug. 12, 1930 |
| 1,867,190 | Stout | July 12, 1932 |
| 1,943,389 | Mercer | Jan. 16, 1934 |
| 1,958,791 | Kalbfleisch et al. | May 15, 1934 |
| 1,991,249 | Ingman et al. | Feb. 12, 1935 |
| 2,161,604 | Watts | June 6, 1939 |
| 2,162,016 | Howell | June 13, 1939 |
| 2,194,345 | Winans | Mar. 19, 1940 |
| 2,226,438 | Moore | Dec. 24, 1940 |
| 2,297,906 | Mace | Oct. 6, 1942 |
| 2,327,733 | Moore | Aug. 24, 1943 |
| 2,354,225 | Stiffler | July 25, 1944 |
| 2,400,675 | Wyllie, Jr. | May 21, 1946 |
| 2,410,873 | Gayring | Nov. 12, 1946 |
| 2,440,314 | Turner | Apr. 27, 1948 |
| 2,446,668 | Tuttle et al. | Aug. 10, 1948 |
| 2,453,900 | Gardiner et al. | Nov. 16, 1948 |
| 2,491,620 | Packard | Dec. 20, 1949 |

FOREIGN PATENTS

| Number | Country | Date |
|---|---|---|
| 711,776 | France | July 8, 1931 |